United States Patent [19]

Kovacs et al.

[11] Patent Number: 5,264,292
[45] Date of Patent: Nov. 23, 1993

[54] TRANSFER FILM HAVING MAGNETIC LAYERS

[75] Inventors: Jenoe Kovacs, Hessheim; Manfred Ohlinger; Manfred Steuerwald, both of Frankenthal, all of Fed. Rep. of Germany

[73] Assignee: BASF Magnetics GmbH, Mannheim, Fed. Rep. of Germany

[21] Appl. No.: 754,848

[22] Filed: Sep. 4, 1991

[30] Foreign Application Priority Data

Sep. 6, 1990 [DE] Fed. Rep. of Germany ....... 4028202

[51] Int. Cl.$^5$ ................................................. B32B 5/16
[52] U.S. Cl. .................................... 428/548; 428/328; 428/900; 428/914; 283/82
[58] Field of Search ............... 428/548, 328, 900, 914; 283/82

[56] References Cited

U.S. PATENT DOCUMENTS

| | | | |
|---|---|---|---|
| 3,566,356 | 2/1971 | Holm et al. | 340/149 |
| 3,986,205 | 10/1976 | Fayling | 360/2 |
| 4,376,006 | 3/1983 | Nishikawa et al. | 156/233 |
| 4,631,223 | 12/1986 | Sander | 428/172 |

FOREIGN PATENT DOCUMENTS

WO87/06745 11/1987 PCT Int'l Appl. .
2153804 8/1985 United Kingdom .

*Primary Examiner*—Alexander S. Thomas
*Attorney, Agent, or Firm*—Keil & Weinkauf

[57] ABSTRACT

Transfer films consist essentially of a support film, a release layer and a transfer layer detachable from this release layer and composed of two magnetic layers and said transfer films may have, on the second magnetic layer, an adhesive layer which serves for fixing the transfer layer to a substrate, the two magnetic layers each containing a magnetizable material having a different coercive force.

2 Claims, No Drawings

TRANSFER FILM HAVING MAGNETIC LAYERS

The present invention relates to transfer films consisting essentially of a support film, a release layer and a transfer layer detachable from this release layer and composed of two magnetic layers, which transfer films may have, on the second magnetic layer, an adhesive layer which serves for fixing the transfer layer to a substrate.

Transfer films, also referred to as blocking films, are used in the production of credit cards, vouchers, railway tickets, parking permits, identity cards, etc. They consist of a support film and a transfer layer which is detachable from this and possesses at least one magnetic layer of a dispersion of magnetizable particles in at least one binder. If necessary, the transfer film may carry, on the side facing away from the support film, an adhesive layer which serves for fixing the transfer layer to a substrate.

Blocking films, in particular hot stamping films, having a magnetic layer and various layers which are mechanically writable are described in DE-B 3422911. U.S. Pat. No. 4 376 006 discloses that a metal layer and a layer of coating resin can be provided on that side of the magnetic layer which faces the support film. This embodiment is intended to provide the possibility of producing a magnetic blocking film in pale colors too, for which purpose the generally dark magnetic layer is covered by the metal layer. A procedure of this type serves purely for decorative purposes.

WO 87/06745 describes a similar procedure. Here too, a top layer is applied to that side of the magnetic layer which faces the support film, said top layer being opaque and thus being intended to cover the specially arranged magnetic and nonmagnetic tracks present on or in the information medium. For purposes of forgery proofing, diffracting structures and holograms can also be incorporated in the transfer layer. To increase the mechanical stability to wear, WO 87/06745 also mentions additional layers which contain nonmagnetic substances.

To make the relevant documents more forgery-proof, U.S. Pat. No. 3 566356 proposes incorporating two magnetic materials having different anisotropy properties as a mixture in one magnetic layer or separately in two magnetic layers. The demagnetization curves are used as a parameter for detecting the authenticity. U.S. Pat. No. 3986205 has the same objective and discloses a similar proposed solution.

To standardize recordings and to safeguard the representation of information on magnetic cards, the latter must, however, meet the international standard ISO 7811/2-1985 which prescribes, inter alia, read voltage curves. These curves must reach defined read voltages, "windows", in certain write current ranges. Without these read voltages, the standardized read/write units cannot operate without errors. The stated ISO standard provides information for pigments having a low coercive force Hc of about 300 oersted (23.9 kA/m). For pigments which have a high coercive force and are increasingly used for identity cards, there is currently no ISO standard. However, the available read/write units are adjusted so that the read voltage curves roughly reach the values prescribed in the standard ISO 7811/2.

It is an object of the present invention to provide, for such magnetic cards, transfer films which are suitable for both read/write units having a low coercive force and those having a high coercive force and which nevertheless reach the read voltages defined in the ISO standard. The stored signals should moreover not be able to be disturbed by the magnetic fields generated by the conventional electrical equipment.

We have found that this object is achieved by transfer films consisting essentially of a support film, a release layer and a transfer layer detachable from this release layer and composed of two magnetic layers if the first magnetic layer adjacent to the release layer contains, as magnetizable material, a material of this type having a coercive force of from 20 to 85 kA/m and the second magnetic layer contains a magnetizable material having a coercive force of from 200 to 500 kA/m and both magnetizable materials consist of a finely divided powder having a specific particle surface area of not less than 20 m$^2$/g and both magnetic layers have a residual induction of not less than 130 mT.

Particularly suitable magnetic materials for the first magnetic layer applied to the support material and the release layer of the transfer film are chromium dioxide materials which have the required properties. When incorporated in the binder and the conventional additives, they have the required residual induction in layer thicknesses of only from 5 to not more than 12 μm. Another advantage permitted by the use of chromium dioxide material is the good orientability of the acicular particles, with the result that the residual induction can be increased in a simple manner. However, the higher the residual induction is, the smaller the thickness of the magnetic layer can be while the read voltages prescribed in the ISO standard are still reached. This thickness of the magnetic layer containing the material having a low coercive force is significant because, after transfer of the transfer film to the card substrate, this layer constitutes the upper layer covering the layer having a high coercive force and consequently should be as thin as possible.

Barium ferrites and/or strontium ferrites are particularly suitable magnetic materials for the upper magnetic layer on the transfer film. For layer thicknesses of 8 μm and more, the required values for the residual induction can be readily reached. Since, when the transfer film is used, i.e. is transferred to a magnetic card substrate, this magnetic layer having a high coercive force is arranged underneath the above-mentioned magnetic layer having a low coercive force, the layer thickness of the magnetic layer containing, for example, barium ferrites and/or strontium ferrites is also partly determined by the layer thickness of the other magnetic layer covering it, since the residual flux is included directly in the read voltages. However, after transfer of the two magnetic layers to the substrate, said read voltages for both magnetic layers must, according to the ISO standard, be such that the signal amplitude of the read voltage is from 80 to 130% of the reference signal at a recording current of from 350 to 500% of the reference value.

When transferred to the final substrate, the novel transfer films meet these requirements in an excellent manner. Since the required residual inductions can readily be obtained using the magnetic layers of the novel transfer films, and the individual magnetic layers can therefore also be made very thin, when the novel transfer films are used a particular advantage is obtained by virtue of the fact that hard, highly crosslinked and/or conductive top layers or cover sheets can be applied on top of the magnetic layers without the values for the read voltage failing to conform to the standard.

The organic binders which are used for the preparation of the magnetizable layers are polyvinylformals, polyurethane elastomers, mixtures of polyisocyanates and relatively high molecular weight polyhydroxy compounds and vinyl chloride polymers having more than 60% of vinyl chloride molecular building blocks, for example vinyl chloride copolymers with vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, such as the esters of acrylic acid, methacrylic acid or maleic acid, or these carboxylic acids themselves as comonomers, and hydroxyl-containing vinyl chloride copolymers which can be prepared by partial hydrolysis of vinyl chloride/vinyl ester copolymers or direct copolymers of vinyl chloride with hydroxyl-containing monomers, such as allyl alcohol or 4-hydroxybutyl or 2-hydroxyethyl (meth)acrylate. Other suitable binders are mixtures of the stated composition. Preferred binders are polyvinylformal binders and polyurethane elastomer mixtures of the stated type, especially with polyvinylformals. Preferably used polyurethane elastomer binders are commerical elastomeric polyurethanes obtained from adipic acid, 1,4-butanediol and 4,4'-diisocyanatodiphenylmethane. Suitable organic solvents for the preparation of the dispersion are the organic solvents known for this purpose, in particular aromatic hydrocarbons, such as benzene, toluene or xylene, alcohols, such as propanol or butanol, ketones, such as acetone or methyl ethyl ketone, ethers, such as tetrahydrofuran or dioxane, and mixtures of such solvents.

The dispersants present in the magnetic layers are comb block copolymers composed of a polyethyleneimine chain as a skeleton having a molecular weight of not less than 2,000, advantageously 6,000 to 25,000, and side chains based on polyesters and/or polyamides, each having a molecular weight of not less than 500, advantageously from 800 to 2,000. These comb block copolymers are known per se and are described in, inter alia, GB-A 2 153 804. It may also be advantageous to use further dispersants, such as aliphatic acids of 12 to 18 carbon atoms, metal soaps thereof, fluorinated eater derivatives thereof and amides thereof, or alkylene oxide/alkylphosphoric acid esters, lecithin or quaternary ammonium sulfates of trialkylpolyolefin oxides and higher alcohols of 12 or more carbon atoms and sulfuric esters thereof. The amount of comb block copolymers in the magnetizable layer is from 1 to 10, preferably from 3 to 6, % by weight based on the amount of magnetizable material.

In addition to the components described, inorganic fillers, such as carbon black, $TiO_2$, tin oxide and the like, may also be used, in a concentration of from 1 to 15, preferably from 2 to 10, % by weight, based on the amount of magnetizable material.

In addition, it is usual to add coating additives, such as tributoxyethylene phosphate or long-chain esters, such as stearates, in a concentration of from 0.2 to 2, preferably from 0.2 to 1, % by weight.

The novel transfer films are essentially produced by known methods. For example, the support film, in general a polyethylene terephthalate film, is first coated with a release layer in a thickness of from 0.1 to 0.5 $\mu$m. This release layer generally consists of polyvinylalkyl carbamate, polyglyceryl stearate, polyvinyl octadecyl ether or similar compounds known for this purpose.

The magnetic layers are then applied in succession to this release layer. They consist of dispersions of the stated compositions. It may be appropriate, before application of the magnetic layers, also to prepare special top layers which form the surface layer after transfer of the transfer film to the substrate intended for the information medium. The top layers advantageously consist of a crosslinked polymer matrix which contains finely divided inorganic pigments, with the result that the layer has not only greater mechanical stability but also low surface resistance. Suitable inorganic pigments are, for example, carbon black, tin dioxide, lithium chloride and the known substances capable of forming conductive centers. These materials are dispersed in a solution of the polymeric binder in a known manner and, after dispersion, are applied in a layer thickness of from 0.2 to 5.0 $\mu$m, preferably from 0.3 to 2.0 $\mu$m, by means of dispersion casters and are crosslinked in a known manner. Suitable binders include the known polyurethanes, epoxy resins, polyvinyl alcohol derivatives, vinyl chloride copolymers, nitrocellulose, polyesters, polyesters having sulfonate groups and polymers having acrylate groups, which are used alone or as mixtures and which can be cured by chemical or electron beam crosslinking.

Depending on the intended use, it is also possible to apply to the magnetic layers an adhesive layer by means of which the magnetic layers of the transfer film can subsequently be fixed to a substrate, preferably hard paper.

The Examples which follow illustrate the invention.

EXAMPLE A 400 kg of steel balls having a diameter of from 4 to 6 mm and 40 parts of a $CrO_2$ pigment having a coercive force of 29.1 kA/m and a specific surface area of 28 m$^2$/g and 1.0 part of Zn oleate were introduced into a 250 l ball mill. Thereafter, 2.67 parts of a 20% strength phenoxy resin solution and 17.07 parts of a 12.5% strength polyurethane solution, 0.27 part of tributoxyethylene phosphate together with 34.93 parts of the solvent mixture 1:1 tetrahydrofuran/dioxane were also added.

The mixture was then treated in the ball mill for 3 days. A further 5.33 parts of the phenoxy resin solution, 34.13 parts of the polyurethane solution. 0.67 part of dioctyl acetate and 1.87 parts of the solvent mixture 1:1 tetrahydrofuran/dioxane were then added. The dispersion was then treated in the ball mill for a further 24 hours.

An 11.5 $\mu$m polyester film was first coated with a 0.5% strength antiadhesion solution of polyvinyl alcohol carbamate using an engraved roll. The layer thickness was 0.3 $\mu$m. A 7.5 $\mu$m thick layer of this dispersion was then applied to this layer. The transfer film thus formed had a coercive force of 27.0 kA/m and a residual induction of 177 mT.

The transfer film was then transferred to a credit card according to ISO standard 7811. The read voltage of the card was exactly at the level of the reference band. The mechanical stability of the magnetic film-was very high. 5,000 passes were carried out using atype MCS 1000 coder and reader from MID'S, Herne/Westphalia without the layer being damaged.

EXAMPLE B 400 parts of steel balls having a diameter of from 4 to 6 mm, 60 parts of a strontium ferrite pigment having a coercive force of 307 kA/m and a BET surface area of 22.5 m$^2$/g and 3.60 parts of carbon black were introduced into a 250 l ball mill. 10 parts of a 20% strength solution of phenoxy resin in tetrahydrofuran/dioxane, 64.0 parts of a 12.5% strength polyurethane solution, 3.84 parts of a comb polymer consisting of polyimine base chain and polyester side chains, having a total molecular weight of 60, 000 and in the form of 50% strength solution in tetrahydrofuran, 0.4 part of 100% pure tributoxyethylene phosphate and 0.2 part of dioctyl acetate, together with 12.08 parts of the solvent mixture consisting of equal amounts of tetrahydrofuran and dioxane, were then also introduced.

The mixture was then treated in the ball mill for 4 days. The prepared dispersion was filtered from the ball mill into cans via a 5 μm filter cloth.

A 15.0 μm polyester film was first coated with a 0.5% strength antiadhesion solution of a polyvinyl alcohol carbamate using an engraved roll. The layer thickness was 0.3 μm. A 1.6 μm thick top layer consisting of 30 parts of carbon black dispersed in a binder dissolved in equal parts of tetrahydrofuran and dioxane and based on polyester, polyurethane and phenoxy resin was then applied to this layer using a knife coater. Coating with the strontium ferrite dispersion was then carried out. The layer thickness was 11.5 μm. The magnetic strip thus obtained had a coercive force of 325 kA/m and a residual induction of 165 mT. The read voltage curve was at the level of the reference band.

EXAMPLE 1

For the production of a two-layer transfer film, a 0.3 μm release layer and a 1.5 μm thick carbon black-containing top layer were first applied to a 15.0 μm polyester film, as described in Example B. A magnetic layer was then applied using the dispersion according to Example B. The layer thicknesses were 7.2 μm for the first layer and 12.5 μm for the second layer. The transfer film thus obtained was transferred to a credit card according to ISO standard 7811, and the maximum read voltage of the card in the LoCo range, measured with a Rinas apparatus, was 8.0 volt. The maximum read voltage in the HiCo range was 7.5 volt.

EXAMPLE 2

The procedure described in Example 1 was followed, a chromium dioxide layer of 4.5 μm and a strontium ferrite layer of 13 μm being produced. The maximum read voltage in the LoCo range was then 4.5 volt and that in the HiCo range was 9.5 volt and thus, respectively, below and above the standard values.

We claim:

1. A magnetic recording member having a plurality of layers including a support film, a release layer applied to said support film and a transferable magnetic layer applied to the release layer which is suitable for recording and reproducing data with read/write apparatus designed for magnetic recording media exhibiting either a high or a low coercivity according to ISO Standard 7811/2, said transferable magnetic layer being detachable from said release layer and consisting of two strata, the first stratum, which is adjacent to the release layer, having a residual induction of not less than 130 mT and containing a magnetic material having a specific particle surface of not less than 20 m$^2$/g and a coercivity of 20 to 85 kA/m, and the second superposed stratum having a residual induction of not less than 130 mT and containing a magnetic material having a specific particle surface of not less than 20 m$^2$/g and a coercivity of from 200 to 500 kA/m.

2. A transfer film as defined in claim 1, wherein the magnetic stratum having a coercive force of from 20 to 85 kA/m has a thickness of from 5 to 12 μm and the second magnetic stratum contains a barium ferrite and/or strontium ferrite and has a thickness of more than 8 μm.

* * * * *